(12) United States Patent
Koskela et al.

(10) Patent No.: US 11,888,783 B2
(45) Date of Patent: Jan. 30, 2024

(54) APPARATUSES AND METHODS FOR PRIORITIZATION BETWEEN PHYSICAL DOWNLINK SHARED CHANNEL AND SYNCHRONIZATION SIGNAL BLOCK RECEPTION

(71) Applicant: NOKIA TECHNOLOGIES OY, Espoo (FI)

(72) Inventors: Timo Koskela, Oulu (FI); Juha Pekka Karjalainen, Oulu (FI); Jorma Johannes Kaikkonen, Oulu (FI); Mihai Enescu, Espoo (FI); Sami-Jukka Hakola, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/856,059

(22) Filed: Jul. 1, 2022

(65) Prior Publication Data
US 2022/0337361 A1  Oct. 20, 2022

Related U.S. Application Data

(63) Continuation of application No. 17/054,100, filed as application No. PCT/EP2019/062044 on May 10, 2019, now Pat. No. 11,411,704.

(Continued)

(51) Int. Cl.
*H04W 72/56* (2023.01)
*H04L 5/00* (2006.01)
(Continued)

(52) U.S. Cl.
CPC ............ *H04L 5/006* (2013.01); *H04L 5/0048* (2013.01); *H04L 5/0082* (2013.01);
(Continued)

(58) Field of Classification Search
CPC . H04W 72/56; H04W 72/542; H04W 72/085; H04W 72/10; H04L 27/2675; H04L 5/006; H04L 5/048; H04L 5/0082
See application file for complete search history.

(56) References Cited

U.S. PATENT DOCUMENTS

2019/0174466 A1* 6/2019 Zhang ..................... H04L 5/005
2019/0239245 A1* 8/2019 Davydov ............... H04W 16/28
(Continued)

FOREIGN PATENT DOCUMENTS

CA    3052762 A1 *  8/2018  ........... H04B 7/0456
CA    3082495 A1    5/2019
(Continued)

OTHER PUBLICATIONS

International Search Report and Written Opinion dated Jul. 1, 2019 corresponding to International Patent Application No. PCT/EP2019/062044. Parent U.S. Appl. No. 17/054,100.
(Continued)

*Primary Examiner* — Phong La
(74) *Attorney, Agent, or Firm* — SQUIRE PATTON BOGGS (US) LLP

(57) ABSTRACT

Systems, methods, apparatuses, and computer program products for selecting or prioritizing between a physical downlink shared channel (PDSCH) and synchronization signal block (SSB) reception are provided. One method may include, when outside a SMTC window and when PDSCH resource allocation overlaps with an occupied SSB location, selecting between the PDSCH and SSB reception according to defined rules.

9 Claims, 5 Drawing Sheets

Related U.S. Application Data

(60) Provisional application No. 62/670,087, filed on May 11, 2018.

(51) Int. Cl.
*H04L 27/26* (2006.01)
*H04W 72/542* (2023.01)

(52) U.S. Cl.
CPC ....... *H04L 27/2675* (2013.01); *H04W 72/542* (2023.01); *H04W 72/56* (2023.01)

(56) References Cited

U.S. PATENT DOCUMENTS

| | | | |
|---|---|---|---|
| 2019/0281587 A1* | 9/2019 | Zhang | H04B 7/088 |
| 2021/0021320 A1* | 1/2021 | Koskela | H04W 56/001 |
| 2021/0160022 A1* | 5/2021 | Cha | H04L 27/261 |
| 2021/0234646 A1 | 7/2021 | Koskela et al. | |
| 2021/0359746 A1* | 11/2021 | Tidestav | H04W 16/28 |
| 2022/0110155 A1 | 4/2022 | Chou et al. | |
| 2022/0337361 A1* | 10/2022 | Koskela | H04W 72/56 |

FOREIGN PATENT DOCUMENTS

| | | | | |
|---|---|---|---|---|
| CA | 3077214 A1 | 9/2020 | | |
| CN | 105009671 B | 5/2019 | | |
| CN | 110035450 A | * | 7/2019 | ........... H04B 17/318 |

OTHER PUBLICATIONS

Ericsson: "Summary of 7.1.1 Synchronization signal," 3GPP Draft; R1-1801074, 3GPP TSG RAN WG1 Meeting AH 1801, Vancouver, Canada, Jan. 25, 2018, XP051385320. Parent U.S. Appl. No. 17/054,100.

Samsung: "On Rate Matching," 3GPP Draft; R1-1717677, 3GPP TSG RAN WG1 Meeting 90bis, Prague, CZ, Oct. 8, 2017, XP051340862. Parent U.S. Appl. No. 17/054,100.

Oppo: "Text Proposal for QCL," 3GPP Draft; R1-1800502, 3GPP TSG RAN WG1 Meeting AH 1801, Vancouver, Canada, Jan. 12, 2018, XP0513884365. Parent U.S. Appl. No. 17/054,100.

3GPP TS 38.213 V15.1.0 (2018-03), Technical Specification, 3rd Generation Partnership Project; Technical Specification Group Radio Access Network; NR; Physical layer procedures for control (Release 15), Mar. 2018. Parent U.S. Appl. No. 17/054,100.

3GPP TS 38.214 V15.1.0 (2018-03), Technical Specification, 3rd Generation Partnership Project; Technical Specification Group Radio Access Network; NR; Physical layer procedures for data (Release 15), Mar. 2018. Parent U.S. Appl. No. 17/054,100.

First Examination Report issued in corresponding Indian Patent Application No. 202047053383 dated Dec. 14, 2021. Parent U.S. Appl. No. 17/054,100.

Communication pursuant to Article 94(3) EPC issued in corresponding European Patent Application No. 19 724 403.1 dated Jun. 28, 2022. Parent U.S. Appl. No. 17/054,100.

* cited by examiner

APPARATUSES AND METHODS FOR PRIORITIZATION BETWEEN PHYSICAL DOWNLINK SHARED CHANNEL AND SYNCHRONIZATION SIGNAL BLOCK RECEPTION

CROSS-REFERENCE TO RELATED APPLICATIONS

This application is a continuation of U.S. patent application Ser. No. 17/054,100 filed on Nov. 9, 2020, which is the 371 U.S. national stage entry of international patent application no. PCT/EP2019/062044 filed on May 10, 2019, which claims priority from U.S. provisional patent application No. 62/670,087 filed on May 11, 2018. The contents of these earlier filed applications are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology. For example, certain embodiments may relate to selecting or prioritizing between a physical downlink shared channel (PDSCH) and synchronization signal/Physical Broadcast Channel block (SS/PBCH or SSB) reception.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

SUMMARY

One embodiment may be directed to a method that may include, when outside a SMTC window and when PDSCH resource allocation overlaps with an occupied SSB location, determining or selecting between the PDSCH and SSB reception according to defined rules.

Another embodiment may be directed to an apparatus that may include at least one processor and at least one memory comprising computer program code. When outside a SMTC window and when PDSCH resource allocation overlaps with an occupied SSB location, the at least one memory and computer program code may be configured, with the at least one processor, to cause the apparatus at least to determine or select between the PDSCH and SSB reception according to defined rules.

In an embodiment, the defined rules may include, when the SS/PBCH block is configured as a resource for L1-reporting, the PDSCH DMRS are not quasi-co-located with the SS/PBCH block, and the time until the next reporting period for L1-RSRP is larger than N SS/PBCH periods, where N may be the number of samples needed for L1 measurement, or X milliseconds for the SS/PBCH block, then PDSCH reception is prioritized.

In an embodiment, the defined rules may include, when the SS/PBCH block is configured as a resource for L1-reporting, the PDSCH DMRS are not QCL'ed with the SS/PBCH block, and the L1-RSRP reporting period is before the next SSB transmission period, then the reception of SS/PBCH for L1-RSRP is prioritized.

In an embodiment, the defined rules may include, when the SS/PBCH block is configured as resource for L1-reporting and the PDSCH DMRS are QCL'ed with the SS/PBCH block, then the PDSCH resource allocation may be rate matched around the SS/PBCH block transmission resources, PDSCH is received, and the L1-RSRP of the SSB block is measured.

In an embodiment, the defined rules may include, when the SS/PBCH block is not configured as resource for L1-reporting and it is outside the SMTC window, and when the PDSCH DMRS are not QCL'ed with the SS/PBCH block, then the reception of PDSCH is prioritized.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for selecting or prioritizing between a physical downlink shared channel (PDSCH) and synchronization signal block (SSB) reception, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Figure 1:
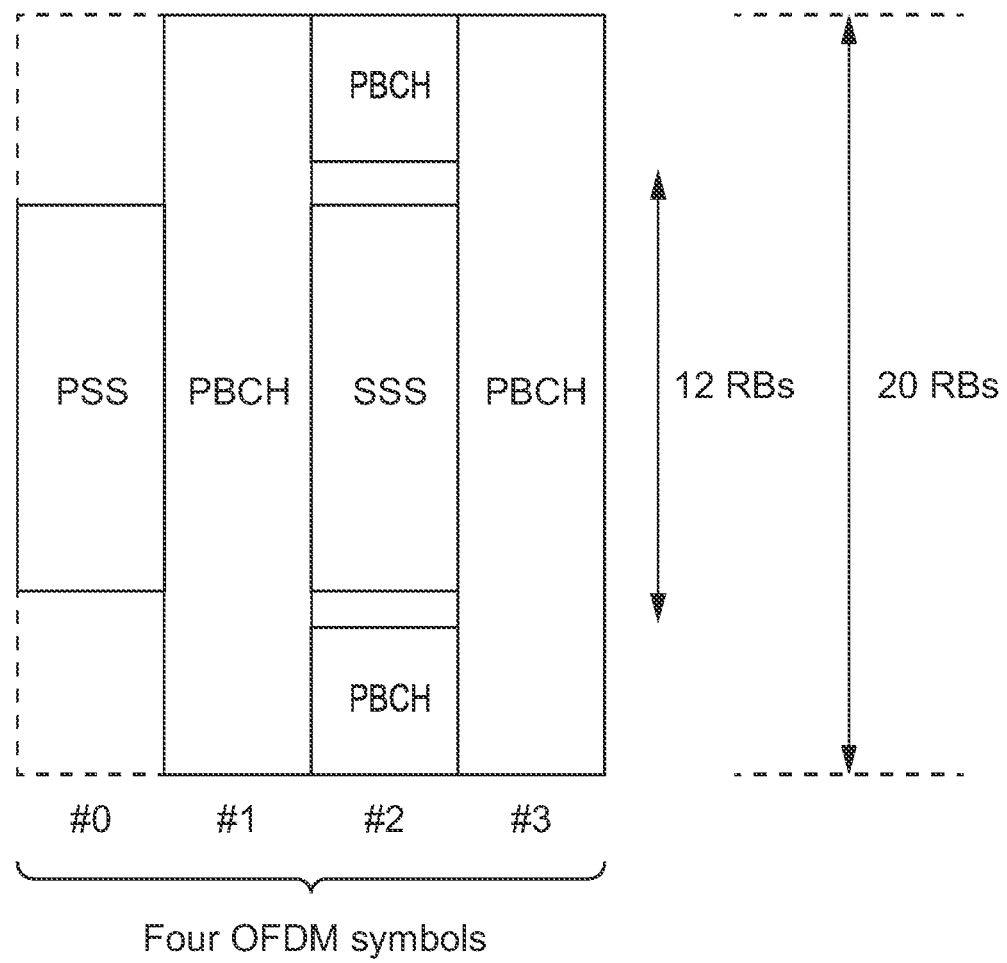
FIG. 1 illustrates an example of a synchronization signal block.

FIG. 1 illustrates an example of a synchronization signal (SS) block (SSB) structure. As illustrated in the example of FIG. 1, a SSB may have four orthogonal division multiplex (OFDM) symbols and may be comprised of Primary Synchronization Signal (PSS), Secondary Synchronization Signal (SSS) and Physical Broadcast Channel (PBCH) signals and channels.

Hence, a SS Block (SSB) may carry synchronization signals such as PSS/SSS and PBCH (including PBCH demodulation reference signals (DMRS)). SS Blocks can be transmitted in certain time locations as specified in the Third Generation Partnership Project Technical Specification (TS) 38.213. The total number of possible time locations (in a half-frame) may depend on the frequency band considered, so that for <3 GHz the maximum number of SSBs locations (L) is 4, for 3-6 GHz L=8, and for above 6 GGHz L=64. SSB may be referred to using the SSB resource index or SSB time location index.

Figure 2:
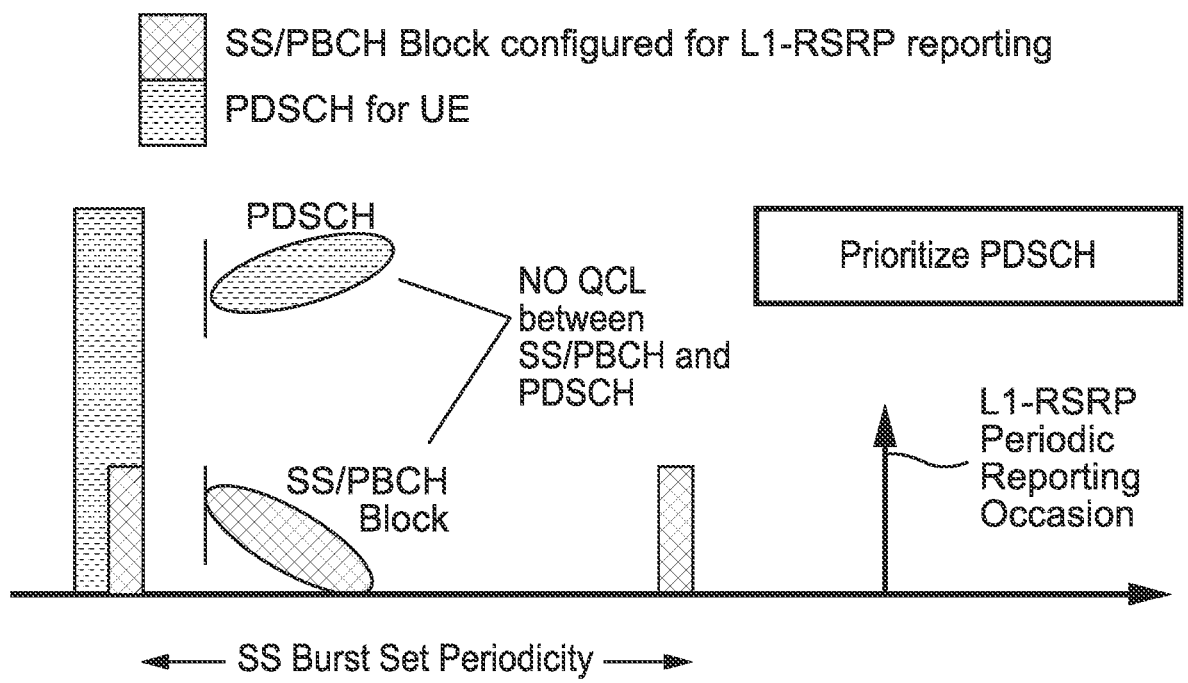
FIG. 2 illustrates an example diagram for how to select between PDSCH and SSB reception, according to one embodiment.
Figure 3:
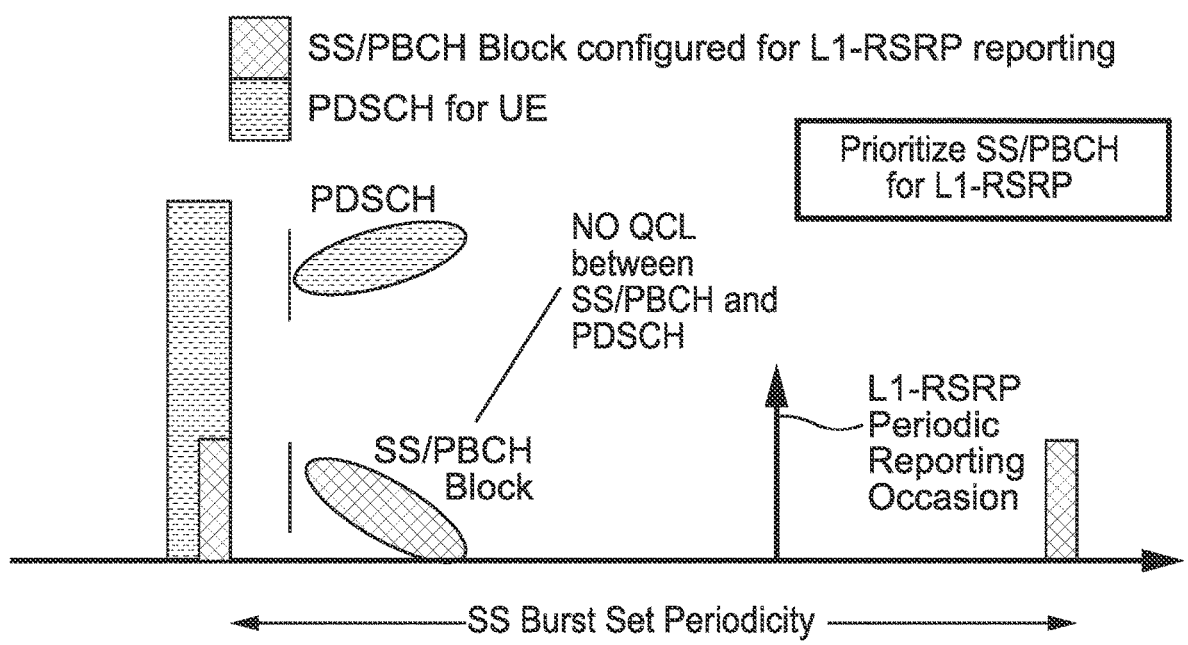
FIG. 3 illustrates an example diagram for how to select between PDSCH and SSB reception, according to another embodiment.

The example of FIG. 1 depicts the SSB location mapping to slots with different sub-carrier spacings. FIGS. 2 and 3 depict the slot pattern (in half-frame) where SSBs can be placed. The transmitted SSBs may then be repeated with a given period that can be {5, 10, 20, 40, 80, 160} ms.

As an example, SS burst set may be contained in 5 ms window. The SS block based RRM measurement timing configuration (SMTC) is a set of parameters defining a measurement window periodicities, duration and offset configuration. A UE can be indicated the occupied SS Block Time locations that the UE needs to monitor and measure per frequency layer, but the UE is not required to measure SS Blocks for L3 mobility (RRM) purposes outside the configured window. A UE can be given, in connected mode, at most 2 SMTC configurations. When a UE is not given the used SSB time locations (IDLE mode), it may assume that all the SS Block locations inside the SMTC window are to be measured.

In new radio (NR), for L1-reference signal received power (RSRP) measurements, a UE may be configured with a set of SSB and channel state information-reference signal (CSI-RS) resources for reporting purposes. In practise, this means that a UE is only required to measure and report L1-RSRP on the configured signals for beam management purposes.

As noted in 3GPP TS 38.214, the time and frequency resources that may be used by a UE to report CSI are controlled by the gNB. The CSI may include Channel Quality Indicator (CQI), precoding matrix indicator (PMI), CSI-RS resource indicator (CRI), SS/PBCH Block Resource indicator (SSBRI), layer indicator (LI), rank indicator (RI), and/or and L1-RSRP. For L1-RSRP computation, a UE may be configured with CSI-RS resources, SS/PBCH Block resources or both CSI-RS and SS/PBCH Block resources. Also, a UE may be configured with a CSI-RS resource setting up to 16 CSI-RS resource sets having up to 64 resources within each set. The total number of different CSI-RS resources over all resource sets is a maximum 128.

A UE can be indicated, for rate matching purposes, the actually-transmitted SS-Blocks in a cell. In frequency range 1 (FR1, i.e., below 6 G), the UE behaviour, in case the PDSCH resource allocation overlaps with the physical resource blocks (PRBs) containing SS/PBCH block transmission resources, is that the UE may rate match the PDSCH resource allocation around the SS Block transmission resources, using the information of used SS block locations in the serving cell (SSB-transmitted/SSB-transmitted-SIB1, signaled by higher layer). If a UE has not been provided with the list of used SSB locations, e.g., via parameter SSB-transmitted (dedicated list) the UE may use the list provided by common signalling, e.g., in SIB1 SSB-transmitted-SIB1.

Radio link monitoring (RLM) and/or Beam failure detection (BFD) measurements are performed on SSB and/or CSI-RS signals which may be explicitly indicated to a UE, i.e., where the network indicates (RRC, or MAC CE or in combination) which configured CSI-RS resource indexes or SSB indexes are used for failure detection. Alternatively, a UE may determine these signals implicitly, i.e., when the network indicates specific CSI-RS or SSB signal to have quasi co-location assumption with PDCCH DMRS (demodulation reference signals), the UE may determine to use CSI-RS or SSB signal as failure detection resources. In other words, a UE may include the set of signals as failure detection resources (either RLM-RS, BFD-RS or both) the downlink reference signals that correspond to the beams used for transmitting PDCCH for the UE. It is not excluded that PDSCH or the corresponding downlink RS can be included in the failure detection RS set. A UE may need to perform periodic measurement for both RLM and BFD purposes. Thus, it may be possible that these signals are measured concurrently with other signals or channels (e.g., for beam management purposes or PDSCH/PDCCH reception) and priority would need to be determined.

One example embodiment may provide solutions for how to determine UE PDSCH reception behaviour depending on the configured SS Blocks for L1-RSRP reporting and quasi-co-location (QCL) assumption between PDSCH resource allocation and SSB symbols.

Another example embodiment may provide solutions for how to determine UE PDSCH reception behavior, for example, depending on the configured CSI-RS for L1-RSRP reporting and quasi-co-location (QCL) assumption between PDSCH resource allocation and CSI-RS for symbols.

In certain embodiments, CSI-RS (or multiple CSI-RS resources) and SSB may be transmitted on same symbols and may or may not share the same QCL properties. In certain embodiments, when CSI-RS and SSB share the QCL assumption (e.g., spatial), they may be considered in a similar manner when determining UE PDSCH reception behavior.

One example embodiment may provide solutions for how to prioritize measurements for failure detection signals depending on the failure indication periodicity, for example, when the failure detection reference signals occupy the same symbols as PDSCH resource allocation or RS signals for other types of measurements.

According to certain example embodiments, when outside the SMTC window and when the PDSCH resource allocation overlaps with the occupied SSB location (indicated by the network for transmission), a UE may determine or select between the PDSCH and SSB reception according to certain rules, as discussed in the following.

In an embodiment, if the SS/PBCH block (or CSI-RS) is configured as a resource for L1-reporting, and the PDSCH DMRS are not quasi-co-located (QCL'ed) (e.g., type D, spatial Rx, where applicable) with the SS/PBCH block, and if the time until the next reporting period for L1-RSRP is larger than N SS/PBCH (or CSI-RS) periods (where N may be derived from L1 RSRP accuracy requirements, i.e., the number of samples needed for L1 measurement) or X milliseconds (where X is configured by network) for the SS/PBCH block (or CSI-RS), the UE is configured to prioritize the reception of PDSCH. More generally, according to one embodiment, if PDSCH is not QCL'ed (with type-D where applicable) with the RS configured for L1-RSRP reporting, then the UE may prioritize reception of the RS configured for L1-RSRP reporting for a certain time window preceding the configured reporting instant. Outside of the time window, the UE may prioritize the scheduled PDSCH. An example of this is illustrated in FIG. 2.

In another embodiment, if the SS/PBCH block (or CSI-RS) is configured as a resource for L1-reporting, and the PDSCH DMRS are not QCL'ed with the SS/PBCH block (or CSI-RS) and the L1-RSRP reporting period is before the next SSB transmission period (or CSI-RS), the UE may prioritize the reception of SS/PBCH (or CSI-RS) for L1-RSRP. An example of this is illustrated in FIG. 3.

In yet another example embodiment, if the SS/PBCH (or CSI-RS) block is configured as resource for L1-reporting, and the PDSCH DMRS are QCL'ed (with type-D where applicable) with the SS/PBCH block (or CSI-RS), the UE may rate match the PDSCH resource allocation around the SS/PBCH Block (or CSI-RS) transmission resources and receive PDSCH and measure the L1-RSRP of the SSB block (or CSI-RS).

According to another example embodiment, if the SS/PBCH block (or CSI-RS) is not configured as resource for L1-reporting (but is configured as occupied SSB location, or the CSI-RS is configured for UE) and it is outside the SMTC window, and the PDSCH DMRS are NOT QCL'ed with the SS/PBCH block (or CSI-RS), the UE may prioritize the reception of PDSCH.

According to yet another embodiment, as described herein as a solution for prioritizing other types of measurements, if a resource is configured for RLM or for BFD and at least one measurement can be made before the indication period (RLM or BFD measurement results are indicated by PHY to higher layer), a UE may prioritize the reception of PDSCH or the measurement for L1-reporting (CSI-RS, SSB) when the signals or channels are not QCL'd with RLM-RS or BFD-RS. In case the UE cannot reach the required amount of measurements before the next indication period, the UE may prioritize RLM-RS and or BFD-RS measurements over reception of PDSCH and/or other measurements of RSs for other purposes. In case RLM-RS and BFD-RS are transmitted simultaneously, and the signals are different and not QCL'd, the UE may prioritize BFD-RS. This may be beneficial as beam failure detection and recovery may affect the cell level radio link monitoring and recovery (when beam failure recovery is successful, typically the cell level radio link problem is considered to be recovered as well). According to yet another embodiment, when a UE has determined that a beam failure has occurred (determined based on the measurements on BFD-RS and determined e.g. at MAC layer) or it has determined that at least one beam failure instance has occurred and indicated within latest N indication periods, and/or at least one of the configured BFD-RS quality is below defined quality threshold, the UE may prioritize the measurements on beam failure detection signals over other signals when they are transmitted concurrently. Alternatively, or additionally, when a UE has declared a beam failure, the UE may prioritize measurements on new candidate beams for beam failure recovery. Prioritization may be done over other signals (signal types) and channels such as RLM-RS, SS/PBCH block/CSI-RS for L3 measurements if it cannot receive these signals/channels simultaneously. In an embodiment, a UE may further prioritize measurements on candidates it can indicate using contention free random access (CFRA) signaling resources. CFRA signals can be SSB or CSI-RS specific signals. Transmission of the signal(s) indicates to the network that beam failure has occurred and the UE has selected that signal as new candidate signal for communication (it can be then used for further downlink (PDCCH and PDSCH) transmissions by the network, or reception of UL transmission). Alternatively, a UE may use contention based random access (CBRA) signals to indicate new candidate beams. Thus, the measurements on the downlink reference signals that can be indicated using CBRA signals/preambles may be prioritized after CFRA signals over measurements on other signals or channels or prioritized measurements for beam failure purposes over other purposes such as RRM (radio resource management or L3 mobility or cell level mobility) or L1-RSRP reporting. In some examples, part of or all recovery candidate signals may be same signals as configured for L1-RSRP reporting and, therefore, signals with such properties may be prioritized in measurements.

In some example embodiments, the prioritization of certain signals could mean, for example, ceasing all measurements on signals that have lower priority, or applying different measurement and/or evaluation periodicities for signals.

In one embodiment, when CSI-RS set is configured for the beam management (e.g., for L1-RSRP reporting or beam refinement), gNB's TX beam sweeping or UE RX beam sweeping can be supported by the value of a repetition information element (i.e., OFF/ON) for the CSI-RS resources within the set. When the value of the repetition is set to 'OFF', a UE can receive simultaneous PDSCH and CSI-RS in the same symbols if the DMRS resources of PDSCH are spatially QCL'd with each CSI-RS resource in the CSI-RS set. If the value of the repetition is set to 'ON' UE RX beam sweeping is performed (as gNB TX beam is the same for each repeated CSI-RS transmissions) and the simultaneous reception of PDSCH and CSI-RS may not be possible on same symbols. In one example, a UE may prioritize PDSCH reception over CSI-RS (with value of repetition set to OFF) and/or SSB based measurements (such as L1-RSRP for beam management) for beam management outside of SMTC window. In another example, if the value of repetition related to CSI-RS resource is set to ON, a UE may prioritize SSB and CSI-RS measurements for beam management (such as beam refinement) over PDSCH.

Figure 4:
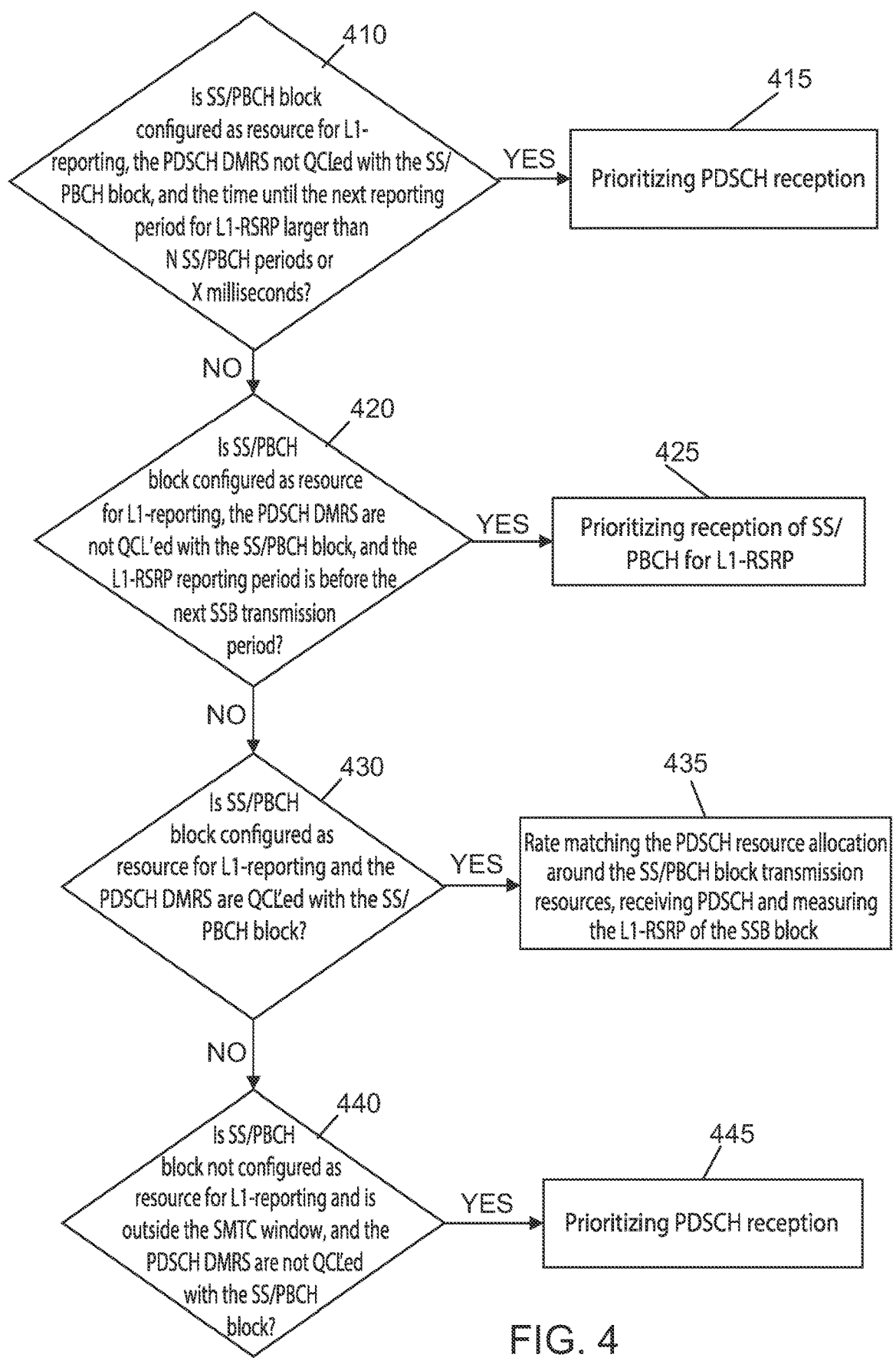
FIG. 4 illustrates an example flow diagram of a method, according to an embodiment.

FIG. 4 illustrates an example flow diagram of a method for determining or selecting between PDSCH and SSB reception when outside the SMTC window and when the PDSCH resource allocation overlaps with the occupied SSB location, according to an embodiment. In certain embodiments, the method of FIG. 4 may be performed by a UE, mobile station, mobile equipment, IoT device, or the like, for example.

As illustrated in the example of FIG. 4, the method may include, at 410, when outside the SMTC window and when the PDSCH resource allocation overlaps with the occupied SSB location (indicated by the network for transmission), determining whether the SS/PBCH block is configured as a resource for L1-reporting, whether the PDSCH DMRS are not quasi-co-located (QCL'ed) (e.g., type D, spatial Rx, where applicable) with the SS/PBCH block, and whether the time until the next reporting period for L1-RSRP is larger than N SS/PBCH periods (where N may derived from L1 RSRP accuracy requirements, i.e., the number of samples needed for L1 measurement) or X milliseconds (where X is configured by network) for the SS/PBCH block. When the result of the determining step 410 is positive, then the method may include, at 415, prioritizing PDSCH reception. In other words, according to this example embodiment, if PDSCH is not QCL'ed (with type-D where applicable) with the RS configured for L1-RSRP reporting, then reception of the RS configured for L1-RSRP reporting is prioritized for a certain time window preceding the configured reporting instant. Outside of the time window, the scheduled PDSCH reception may be prioritized. As an example, when signals share the same QCL assumption between each other, they share the same indicted property such as delay spread, Doppler spread, Doppler shift, average delay, and/or spatial reception parameters. Also as an example, when signals have the spatial RX QCL assumption, it would mean that UE can assume a same RX beam (rx spatial filter configuration) when receiving the signals.

In an example embodiment, when the result of the determining step 410 is negative, then the method may include, at 420, determining whether the SS/PBCH block is configured as a resource for L1-reporting, whether the PDSCH DMRS are not QCL'ed with the SS/PBCH block, and whether the L1-RSRP reporting period is before the next SSB transmission period. When the result of the determining step 420 is positive, then the method may include, at 425, prioritizing the reception of SS/PBCH for L1-RSRP.

In one example embodiment, when the result of the determining step 420 is negative, then the method may include, at 430, determining whether the SS/PBCH block is configured as resource for L1-reporting and whether the PDSCH DMRS are QCL'ed (with type-D where applicable) with the SS/PBCH block. When the result of the determining step 430 is positive, then the method may include, at 435, rate matching the PDSCH resource allocation around the SS/PBCH block transmission resources and receiving PDSCH and measuring the L1-RSRP of the SSB block.

According to another example embodiment, when the result of the determining step 430 is negative, then the method may include, at 440, determining whether the SS/PBCH block is not configured as resource for L1-reporting (but is configured as occupied SSB location) and it is outside the SMTC window, and whether the PDSCH DMRS are not QCL'ed with the SS/PBCH block. When the result of the determining step 440 is positive, then the method may include, at 445, then the method may include prioritizing the reception of PDSCH. When the result of the determining step 440 is negative, then the method may return to step 410.

Figure 5:
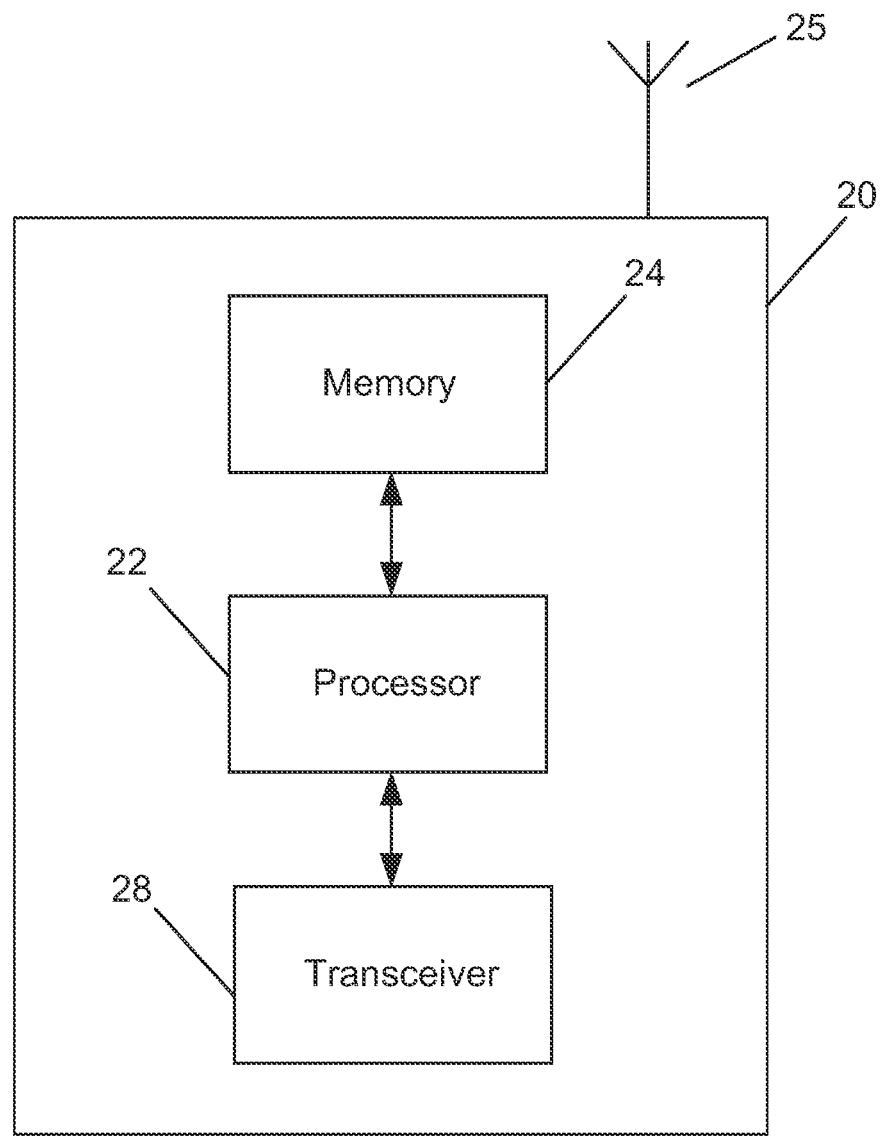
FIG. 5 illustrates an example block diagram of an apparatus, according to one embodiment.

FIG. 5 illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 5.

As illustrated in the example of FIG. 5, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 10 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10, which may represent one or more access nodes or base stations, such as an eNB or gNB, via a wireless or wired communications link according to any radio access technology, such as 5G or NR.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as the flow diagram illustrated in FIG. 4.

According to some embodiments, apparatus 20 may be controlled by memory 24 and processor 22 to determine or select between PDSCH and SSB reception when outside the SMTC window and when the PDSCH resource allocation overlaps with the occupied SSB location, according to an embodiment.

In one embodiment, when outside the SMTC window and when the PDSCH resource allocation overlaps with the occupied SSB location (indicated by the network for transmission), apparatus 20 may be controlled by memory 24 and processor 22 to determine whether the SS/PBCH block is configured as a resource for L1-reporting, whether the PDSCH DMRS are not quasi-co-located (QCL'ed) (e.g., type D, spatial Rx, where applicable) with the SS/PBCH block, and whether the time until the next reporting period for L1-RSRP is larger than N-SS/PBCH periods (where N may derived from L1 RSRP accuracy requirements, i.e., the number of samples (separate measurement occasions on the same signal) needed for L1 measurement) or X milliseconds (where X is configured by network) for the SS/PBCH block. When apparatus 20 determines that the SS/PBCH block is configured as a resource for L1-reporting, the PDSCH DMRS are not QCL'ed with the SS/PBCH block, and the time until the next reporting period for L1-RSRP is larger than N SS/PBCH periods or X milliseconds for the SS/PBCH block, then apparatus 20 may be controlled by memory 24 and processor 22 to prioritize PDSCH reception.

In an example embodiment, apparatus 20 may be further controlled by memory 24 and processor 22 to determine whether the SS/PBCH block is configured as a resource for L1-reporting, whether the PDSCH DMRS are not QCL'ed with the SS/PBCH block, and whether the L1-RSRP reporting period is before the next SSB transmission period. When apparatus 20 determines that the SS/PBCH block is configured as a resource for L1-reporting, the PDSCH DMRS are not QCL'ed with the SS/PBCH block, and the L1-RSRP reporting period is before the next SSB transmission period, then apparatus 20 may be controlled by memory 24 and processor 22 to prioritize the reception of SS/PBCH for L1-RSRP.

In one example embodiment, apparatus 20 may be further controlled by memory 24 and processor 22 to determine whether the SS/PBCH block is configured as resource for L1-reporting and whether the PDSCH DMRS are QCL'ed with the SS/PBCH block. When apparatus 20 determines that the SS/PBCH block is configured as resource for L1-reporting and the PDSCH DMRS are QCL'ed with the SS/PBCH block, then apparatus 20 may be controlled by memory 24 and processor 22 to rate match the PDSCH resource allocation around the SS/PBCH block transmission resources and receive PDSCH and measure the L1-RSRP of the SSB block.

According to another example embodiment, apparatus 20 may be further controlled by memory 24 and processor 22 to determine whether the SS/PBCH block is not configured as resource for L1-reporting (but is configured as occupied SSB location) and it is outside the SMTC window, and whether the PDSCH DMRS are not QCL'ed with the SS/PBCH block. When apparatus 20 determines that the SS/PBCH block is not configured as resource for L1-reporting (but is configured as occupied SSB location) and it is outside the SMTC window, and that the PDSCH DMRS are not QCL'ed with the SS/PBCH block, then apparatus 20 may be controlled by memory 24 and processor 22 to prioritize the reception of PDSCH.

Therefore, certain example embodiments provide several technical improvements, enhancements, and/or advantages. Various example embodiments can, for example, provide defined rules that allow a UE to receive data when the PDSCH and SSB occur on the same PRBs and have no QCL assumption (spatial) and when the UE is not able to receive both PDSCH and SSB (multi TRP case). As a result, certain embodiments can achieve increased throughput, such as when a UE is able to prioritize data reception over measurements. Consequently, certain example embodiments can reduce overhead and improve the reliability and speed of networks. As such, example embodiments can improve performance, latency, and/or throughput of networks and network nodes including, for example, access points, base stations/eNBs/gNBs, and mobile devices or UEs. Accordingly, the use of certain example embodiments results in improved functioning of communications networks and their nodes. In beam failure case the prioritization of new candidate measurements can reduce the link recovery latency and thus improve the quality of the communication.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

We claim:

1. An apparatus to determine or select a reception of at least one of a physical downlink shared channel, a synchronization signal block, or a channel state information reference signal when a physical downlink shared channel resource allocation overlaps with a synchronization signal block or a channel state information reference signal location, the apparatus comprising:
   at least one processor; and
   at least one memory comprising computer program code,
      wherein the at least one memory and computer program code are configured, with the at least one processor, to cause the apparatus at least to perform:
   when a value of repetition related to a channel state information-reference signal resource is set to ON, prioritizing synchronization signal block and channel state information-reference signal measurements for beam management over the physical downlink shared channel; and
   when the value of the repetition related to the channel state information-reference signal resource is set to OFF, receiving the physical downlink shared channel and the channel state information-reference signal in same symbols when demodulation reference signal resources of the physical downlink shared channel are spatially quasi-co-located with the channel state information-reference signal resource.

2. The apparatus of claim 1, wherein the prioritizing comprises prioritizing the synchronization signal block and channel state information-reference signal measurements on beam failure detection signals over other signals when they are transmitted concurrently.

3. The apparatus of claim 1, wherein, when beam failure has occurred, the prioritizing comprises prioritizing measurements on new candidate beams for recovery from the beam failure.

4. The apparatus of claim 1, wherein, when the value of the repetition related to the channel state information-reference signal resource is set to ON, the at least one memory and computer program code are configured, with the at least one processor, to cause the apparatus at least to perform beam sweeping, and wherein simultaneous reception of physical downlink shared channel and channel state information-reference signal is not be possible on the same symbols.

5. A method for determining or selecting a reception of at least one of a physical downlink shared channel, a synchronization signal block, or a channel state information reference signal when a physical downlink shared channel resource allocation overlaps with a synchronization signal block or a channel state information reference signal location, the method, comprising:
when a value of repetition related to a channel state information-reference signal resource is set to ON, prioritizing synchronization signal block and channel state information-reference signal measurements for beam management over the physical downlink shared channel;
when the value of the repetition related to the channel state information-reference signal resource is set to OFF, receiving the physical downlink shared channel and the channel state information-reference signal in same symbols when demodulation reference signal resources of the physical downlink shared channel are spatially quasi-co-located with the channel state information-reference signal resource.

6. The method of claim 5, wherein the prioritizing comprises prioritizing the synchronization signal block and channel state information-reference signal measurements on beam failure detection signals over other signals when they are transmitted concurrently.

7. The method of claim 5, wherein, when beam failure has occurred, the prioritizing comprises prioritizing measurements on new candidate beams for recovery from the beam failure.

8. The method of claim 5, comprising:
when the value of the repetition related to the channel state information-reference signal resource is set to ON, performing beam sweeping, wherein simultaneous reception of the physical downlink shared channel and the channel state information-reference signal is not be possible on the same symbols.

9. A non-transitory computer readable medium comprising program instructions stored thereon for performing at least the method according to claim 5.

* * * * *